(12) United States Patent
Desclos et al.

(10) Patent No.: US 11,038,270 B2
(45) Date of Patent: *Jun. 15, 2021

(54) ACTIVE ANTENNA STEERING FOR NETWORK SECURITY

(71) Applicant: Ethertronics, Inc., San Diego, CA (US)

(72) Inventors: Laurent Desclos, San Diego, CA (US); Olivier Pajona, Antibes (FR)

(73) Assignee: Ethertronics, Inc., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/679,468

(22) Filed: Nov. 11, 2019

(65) Prior Publication Data

US 2020/0076074 A1    Mar. 5, 2020

Related U.S. Application Data

(63) Continuation of application No. 15/828,151, filed on Nov. 30, 2017, now Pat. No. 10,476,155.

(60) Provisional application No. 62/428,489, filed on Nov. 30, 2016.

(51) Int. Cl.

| | |
|---|---|
| *H04L 29/06* | (2006.01) |
| *H01Q 3/44* | (2006.01) |
| *H04B 7/06* | (2006.01) |
| *H01Q 5/385* | (2015.01) |
| *H01Q 3/26* | (2006.01) |

(Continued)

(52) U.S. Cl.
CPC .............. *H01Q 3/44* (2013.01); *H01Q 3/2635* (2013.01); *H01Q 5/385* (2015.01); *H04B 7/043* (2013.01); *H04B 7/0695* (2013.01); *H04L 63/107* (2013.01); *H04W 12/08* (2013.01); *H04B 7/0632* (2013.01)

(58) Field of Classification Search
CPC .... H04B 7/043; H04B 7/0632; H04B 7/0695; H04L 63/107; H04W 12/03
See application file for complete search history.

(56) References Cited

U.S. PATENT DOCUMENTS

| | | |
|---|---|---|
| 6,765,536 B2 | 7/2004 | Phillips et al. |
| 6,987,493 B2 | 1/2006 | Chen |
| 7,068,234 B2 | 6/2006 | Sievenpiper |

(Continued)

FOREIGN PATENT DOCUMENTS

| | | |
|---|---|---|
| CN | 102668641 | 1/2016 |
| WO | WO 2012/114233 | 8/2012 |
| WO | WO 2014/204171 | 12/2014 |

OTHER PUBLICATIONS

PCT International Search Report and Written Opinion for corresponding PCT Application No. PCT/US2017/064047, dated Jun. 7, 2018, 6 pages.

(Continued)

*Primary Examiner* — Mansour Oveissi
(74) *Attorney, Agent, or Firm* — Dority & Manning, PA

(57) ABSTRACT

The disclosure concerns wireless communication systems, including, antenna systems and related methods, which are each directed to utilizing one or more multi-mode antennas for the purpose of varying a radiation pattern characteristic thereof to enhance network security and communication link between an access point and one or more client devices on a network.

14 Claims, 5 Drawing Sheets

(51) Int. Cl.
    *H04B 7/0426* (2017.01)
    *H04W 12/08* (2021.01)

(56) References Cited

U.S. PATENT DOCUMENTS

| | | |
|---|---|---|
| 7,215,289 B2 | 5/2007 | Harano |
| 7,911,402 B2 | 3/2011 | Rowson et al. |
| 8,362,962 B2 | 1/2013 | Rowson et al. |
| 8,446,318 B2 | 5/2013 | Ali et al. |
| 8,648,755 B2 | 2/2014 | Rowson et al. |
| 9,065,496 B2 | 6/2015 | Rowson et al. |
| 9,231,669 B2 | 1/2016 | Desclos et al. |
| 9,240,634 B2 | 1/2016 | Rowson et al. |
| 9,425,497 B2 | 8/2016 | Pajona et al. |
| 9,439,151 B2 | 9/2016 | Zhu et al. |
| 9,479,242 B2 | 10/2016 | Desclos et al. |
| 9,590,703 B2 | 3/2017 | Desclos et al. |
| 9,755,580 B2 | 9/2017 | Desclos et al. |
| 2003/0193446 A1 | 10/2003 | Shuguang |
| 2005/0120242 A1* | 6/2005 | Mayer .................. G06F 21/56 726/4 |
| 2012/0214403 A1 | 8/2012 | Yaron et al. |
| 2013/0070741 A1 | 3/2013 | Li et al. |
| 2013/0135163 A1 | 5/2013 | Laurent et al. |
| 2014/0087781 A1 | 3/2014 | Desclos |
| 2016/0036508 A1* | 2/2016 | Szini .................... H04B 7/0814 375/227 |
| 2016/0183275 A1 | 6/2016 | Inoue et al. |
| 2017/0195826 A1 | 7/2017 | Shaikh |

OTHER PUBLICATIONS

International Preliminary Report on Patentability for corresponding PCT Application No. PCT/US2017/064047, dated Jun. 4, 2019, 6 pages.
Vaughan, "Switches Parasitic Elements for Antenna Diversity", IEEE Transactions on Antennas and Propagation, vol. 47, No. 2, Feb. 1, 1999, pp. 399-405.

* cited by examiner

Example of Link Quality matrix

|  | | Between AP and Device 1 | | | | Between AP and Device 2 | | | |
|---|---|---|---|---|---|---|---|---|---|
|  | | NS mode 1 | NS mode 2 | NS mode 3 | NS mode 4 | NS mode 1 | NS mode 2 | NS mode 3 | NS mode 4 |
| AP | Antenna 1 | 12 | 1 | 11 | 2 | 4 | 2 | 6 | 5 |
|  | Antenna 2 | 9 | 8 | 5 | 6 | 13 | 8 | 5 | 1 |
|  | Antenna 3 | 2 | 2 | 4 | 3 | 4 | 2 | 2 | 6 |
|  | Antenna 4 | 5 | 4 | 3 | 13 | 1 | 15 | 8 | 15 |

*FIG.3*

ACTIVE ANTENNA STEERING FOR NETWORK SECURITY

CROSS-REFERENCE TO RELATED APPLICATIONS

The present application is a continuation of U.S. application Ser. No. 15/828,151, filed Nov. 30, 2017, which claims benefit of priority with U.S. Provisional Application Ser. No. 62/428,489, filed Nov. 30, 2016; the entire contents of which are hereby incorporated by reference.

BACKGROUND

Field of the Invention

This invention relates to wireless communication systems, and more particularly, to such wireless communication systems and related methods utilizing one or more active multi-mode antennas for network security.

Description of the Related Art

Active multi-mode antennas, also known as "modal antennas", generally include a relatively small form factor capable of configuration about a plurality of possible antenna modes, wherein the active multi-mode antenna exhibits distinct radiation pattern characteristics in each mode of the plurality of possible antenna modes. As a result, the antenna radiation pattern can be incrementally adjusted or "steered" about the antenna structure, such that a null, or gain, in the antenna radiation pattern can be directionally adjusted (null steering, beam steering, respectively). In addition, a frequency response of the antenna can be adjusted to create or remove one or more resonances, and the resonances can be shifted or tuned to achieve a desired frequency response. Accordingly, beam steering, null steering, and frequency response are each factors which can be controlled by a single active multi-mode antenna.

Prior to the advent of the active multi-mode antenna, engineers would implement various techniques to achieve desired antenna system parameters. For example, one might have provided two distinct antennas, each in a distinct orientation, and a system capable of switching between the two distinctly oriented antennas in order to achieve a desired performance goal.

In another example, two antennas having distinct polarization could be implemented, and the one antenna with better performance according to a desired metric would be selected for operation.

Other conventional techniques include the use of antenna arrays having a plurality of antennas connected therein, and selectively radiating one or more of the plurality of antennas in the array to achieve beam forming and/or beam steering.

In contrast, the active multi-mode antenna includes a single antenna radiating element and one or a plurality of parasitic conductor elements and active components associated therewith which collectively form the multi-mode antenna. The active multi-mode antenna is capable of dynamically adjusting one or more radiation pattern characteristics, such that the multi-mode antenna is adjustable to achieve a desired result. No longer are multiple antennas required to achieve directional nulls, gains and frequency variations.

Examples of multi-mode antennas are described in commonly owned U.S. Pat. Nos. 9,240,634; 8,648,755; 8,362,962; and 7,911,402; the entire contents of each of which is hereby incorporated by reference. Since the structure of a multi-mode antenna is addressed in at least these references, we will not reiterate such descriptions here. Instead, any reviewer of this document may reference the above patent literature for specifics related to the structure of multi-mode antennas.

One benefit of such multi-mode antennas includes lower cost since only one antenna radiating element is being provided, as opposed to two or more in the conventional antennas in an array or switchable configuration. Another benefit includes reduced space occupied by a single multi-mode antenna as opposed to utilizing a prior scheme which requires two or more antennas and correspondingly more space. As consumer demand drives a need for smaller devices, the need for reduced space from device components, such as antennas, becomes increasingly relevant. In addition, the multi-mode antenna often provides a reduction in power requirements with respect to other multi-antenna schemes for beam forming and null steering.

Other features and specifics would be recognized by those having skill in the art upon a thorough review of the instant disclosure and other details as referenced in the related art literature cited herein.

SUMMARY

The disclosure concerns wireless communication systems, including antenna systems and related methods, which are each directed to utilizing one or more active multi-mode antennas for the purpose of varying a radiation patient characteristic thereof to enhance network security and communication link between an access point and one or more user equipment (UE) devices on a network.

BRIEF DESCRIPTION OF THE DRAWINGS

FIG. 3 shows an example of a link quality matrix, wherein each antenna is surveyed for each antenna mode and each device on the network and the corresponding signal link quality is determined and populated in the matrix.

DETAILED DESCRIPTION OF THE PREFERRED EMBODIMENTS

Figure 1:
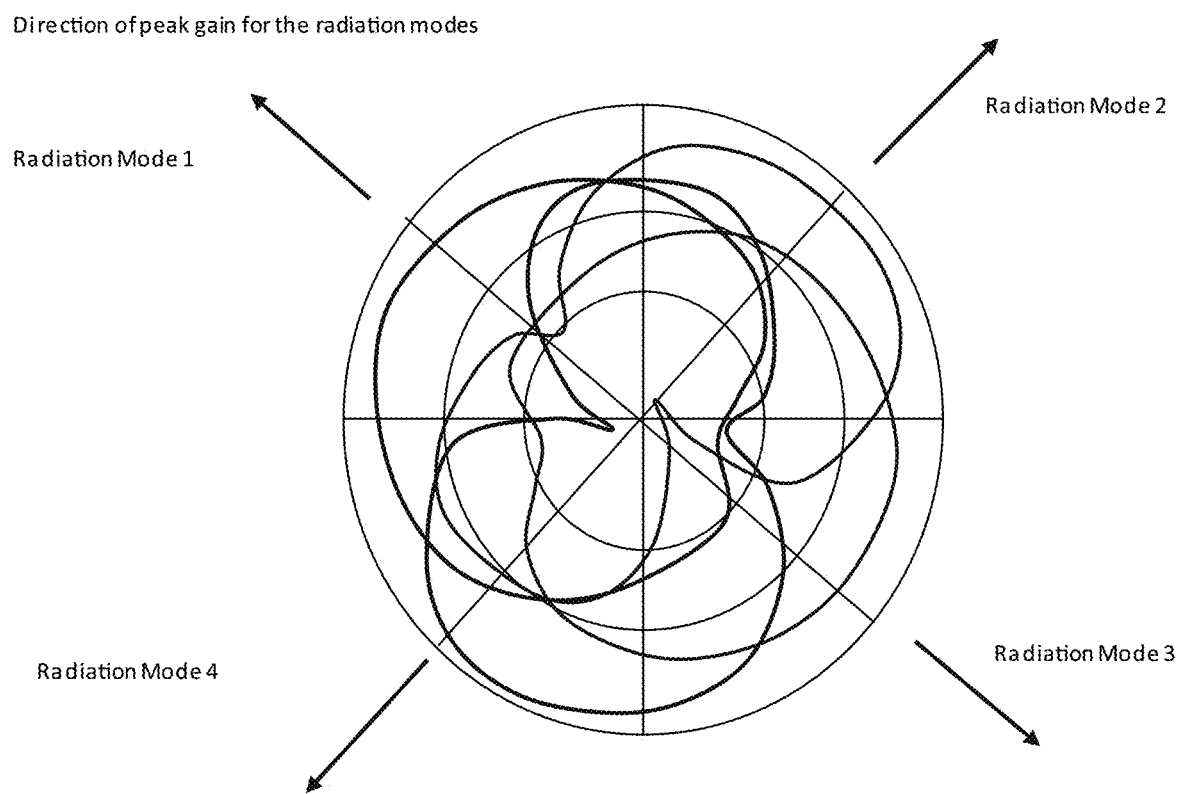
FIG. 1 shows the direction of peak gain for the radiation modes of an active multi-mode antenna having four distinct modes thereof.

In the following description, for purposes of explanation and not limitation, details and descriptions are set forth in order to provide a thorough understanding of the invention in accordance with one or more illustrated embodiments. However, it will be apparent to those skilled in the art that the invention may be practiced in other embodiments that depart from these details and descriptions without departing from the spirit and scope of the invention. One or more illustrated embodiments will be described herein with reference to the drawings wherein illustrative features are denoted by reference numerals. It is recognized that the present described embodiment(s) may be varied and certain features added, removed or interchanged, such that one might accomplish substantially the same result by way of similar means. Accordingly, the scope of the invention is not intended to be limited by the present disclosure, but instead, should be ascertained by reviewing the claims in their broadest construction.

Definitions

For purposes herein, the term "Interfering signal" shall mean: a signal operating within the same frequency range or same frequency channel of a targeted communication link, and disturbing by its power or its behavior, the other signals in the frequency bands or in the channel.

The term "active multi-mode antenna" means an antenna with a single radiating element, and one or more parasitic conductor elements positioned adjacent to the single radiating element, the one or more parasitic conductor elements being further coupled to one or more active components, respectively, for varying a reactive loading of associated with the parasitic element and thereby changing a radiation pattern characteristic of the active multi-mode antenna. The active multi-mode antenna is configurable in at least two modes, wherein the antenna provides a distinct radiation pattern characteristic in each of the at least two modes.

The term "radiating element" means an antenna structure coupled to a signal source and designed to excite the propagation of electromagnetic signals.

The terms "parasitic conductor element", or "parasitic element", may be used interchangeably and are defined as a conductor element positioned adjacent to a radiating element and not connected to a signal source, the parasitic element being configured to alter a radiation pattern characteristic of the adjacent radiating element; wherein the degree at which the parasitic element may alter the radiation pattern characteristic is influenced by a reactive loading associated with the parasitic element by way of the one or more active components and placement of the parasitic element relative to the radiating element.

The terms "active component" or "active components" (plural designation) mean any component known by those having skill in the art which can be used to vary a reactive load associated with the parasitic element, or a combination of such components, including but not limited to capacitors, inductors, variable (tunable) capacitors, variable inductors, switches, transistors, or any combination thereof.

The term signal source means a radio circuit such as a receiver, transmitter or transceiver.

General Information:

Active multi-mode antennas can be used in various implementations in order to achieve improved communication system performance.

In one example, an active multi-mode antenna can be implemented on the user equipment device (or "client") side, i.e. within a device such as a cell phone, tablet, laptop or similar device. The multi-mode antenna within the device can be utilized to vary the antenna radiation pattern thereof for: (i) improving signal link between the device and an access point or network node, (ii) reducing interference from unwanted sources (null steering); (iii) reducing specific absorption rate (SAR) exposure; (iv) tracking direction of a signal; (v) improving network usage by improving the "clear to talk" process in a WiFi network; or (vi) a combination thereof.

In another example, a multi-mode antenna can be implemented on the access point (or "server") side, i.e. within an access point or similar network node. The multi-mode antenna within the access point can be utilized to vary the antenna radiation pattern thereof for: (i) improving signal link budget (throughputs and coverage) between the access point and one or more client devices connected therewith, (ii) load balancing of the client data access requirements; (iii) improving network usage by improving the "clear to talk" process in a WiFi network, (iv) allowing device localization; or (v) a combination thereof. One or more active multi-mode antennas can be incorporated into the access point or node, and each of the multi-mode antennas can be configured to provide one or more of the above functions, or other similar functions.

In yet another example, one or more multi-mode antennas can be implemented on a network level, and can be utilized to vary the respective antenna radiation patterns thereof for: (i) improving intercell or inter communication handover; (ii) allowing dynamic load balancing between access points; (iii) allowing dynamic meshing reconfiguration of heterogamous network; or (vi) a combination thereof.

Thus, null steering, beam steering, and other adjustments made possible through the use and implementation of active multi-mode antennas provide a range of capabilities for managing communications across various network levels (device, access point, network).

Now concerning network security, unwanted eaves dropping, signal sniffing, recording, and packet sniffing is a security weakness on any WiFi network resulting in a possible security breach.

Moreover, a physical network will be defined by a physical footprint, including one or more trusted areas and one or more untrusted or unknown areas. For example, a building might include a keyed access wherein employees and security-entrusted personnel have access to the one or more trusted areas, while the general public may have access to one or more untrusted or unknown areas. Here, it may be beneficial to increase noise or otherwise minimize link budget for devices outside the trusted areas of the network footprint.

In some embodiments, an active multi-mode antenna is implemented in a network device or node and configured in an antenna mode (of the plurality of possible antenna modes) such that maximum gain is provided toward an identified area within the network footprint, or where it may be desired to raise the noise floor level, for example, in an "untrusted area". Concurrently, the antenna can further be configured in the mode that best minimizes antenna gain toward another area of the network footprint wherein trusted devices reside, or a "trusted area". In this regard, the active multi-mode antenna can be configured to increase noise in the untrusted area(s) while minimizing the noise impact with respect to devices in the trusted area(s). This is achieved by selecting an optimal mode wherein nulls and gain maxima are each considered and oriented in an intended direction.

With increased noise in the direction of an untrusted area, the possibility of a security breach is significantly reduced at the access point.

In other embodiments, a multi-input multi-output (MIMO) antenna system is implemented in an access point, the MIMO antenna system includes a plurality of active multi-mode antennas. In the event one or more of the MIMO chains is not in use, the access point and integrated MIMO antenna system is configured to generate noise, wherein one or more nulls are formed in the radiation pattern and said one or more nulls are pointed toward a trusted area such that noise is not directed toward approved or trusted devices in the trusted area.

It has been contemplated that link budget can be maximized between an access point and a client device in order to improve the useful payload sent to the device. Link budget can be maximized by selecting a mode of the modal antenna which optimizes the link. However, in certain embodiments, signal to interference plus notice ration (SINR) is minimized in order to protect the user equipment (UE) device from the noise that the access point will generate via the noise-creating antenna.

In various embodiments, the access point is configured to identify one or more user equipment (UE) devices pinging or connected to the network, and said access point is further configured to create noise through one or more active multi-mode antennas thereof, wherein the noise is directed toward untrusted devices, untrusted areas, or a combination thereof, such that network security is physically protected.

While some embodiments describe the use of an active multi-mode antenna for generating noise or interfering signals and steering the active multi-mode antenna such that the interfering signals are directed to untrusted devices or areas, the reverse application can be appreciated where a communication signal (as opposed to noise) is communicated with maxima directed toward trusted devices or areas and one or more nulls are directed toward one or more untrusted devices or area.

In some embodiments, one or more active multi-mode antennas can be used to sample link quality with devices in the network footprint and estimate position of the devices based on an operation which compares stored radiation pattern mode data and sampled data from the devices to estimate device locations. Upon determining device locations, and determining untrusted or unknown devices, one of the one or more active multi-mode antennas can be used to produce an interfering signal and configured in a mode for directing gain of the interfering signal in a direction of the untrusted or unknown device for preventing network connection and improving network security.

In other embodiments, a network engineer can use a device configured with a software application ("app") for communicating with the access point, wherein the app communicates location of the device with the access point in a "learning mode" such that the access point may learn which locations within the building or network footprint are "untrusted" and which are "trusted". For example, the device can be configured with GPS or other location finding means known in the art, the location of the device can be accessed by the app and stored in the form of data, on the device or on a network server. The app installed on the device can further be configured with a GUI and a means for selecting "location is trusted" or "location is untrusted". The network engineer can physically present the device at each location in the network footprint and execute from "trusted" and "untrusted" such that the access point can learn and store data relating to trusted and untrusted areas. In this example, any area located between three or more untrusted points will be learned as an untrusted area, whereas any area located between three or more trusted points will be learned by the access point as a trusted area. In this regard, the access point can learn and store information related to trusted and untrusted areas in the network footprint for future use in directing interfering signals for network security.

Illustrated Embodiments

Now turning to the drawings, FIG. 1 shows the direction of peak gain for the radiation pattern modes of an active multi-mode antenna having four distinct modes thereof. Here, the antenna exhibits a distinct radiation pattern (Radiation Mode 1 through 4) in each of the four modes. Such a multi-mode antenna having multiple radiation modes with a distinct radiation pattern corresponding to the antenna when in each mode, respectively, is integrated into a radio or access point, and the mode of the antenna is selected to optimize the antenna radiation pattern to improve communication link performance, or to create noise for reducing communication performance when desired. Note the direction of peak gain is distinct in each of the four modes of the active multi-mode antenna.

Figure 2:
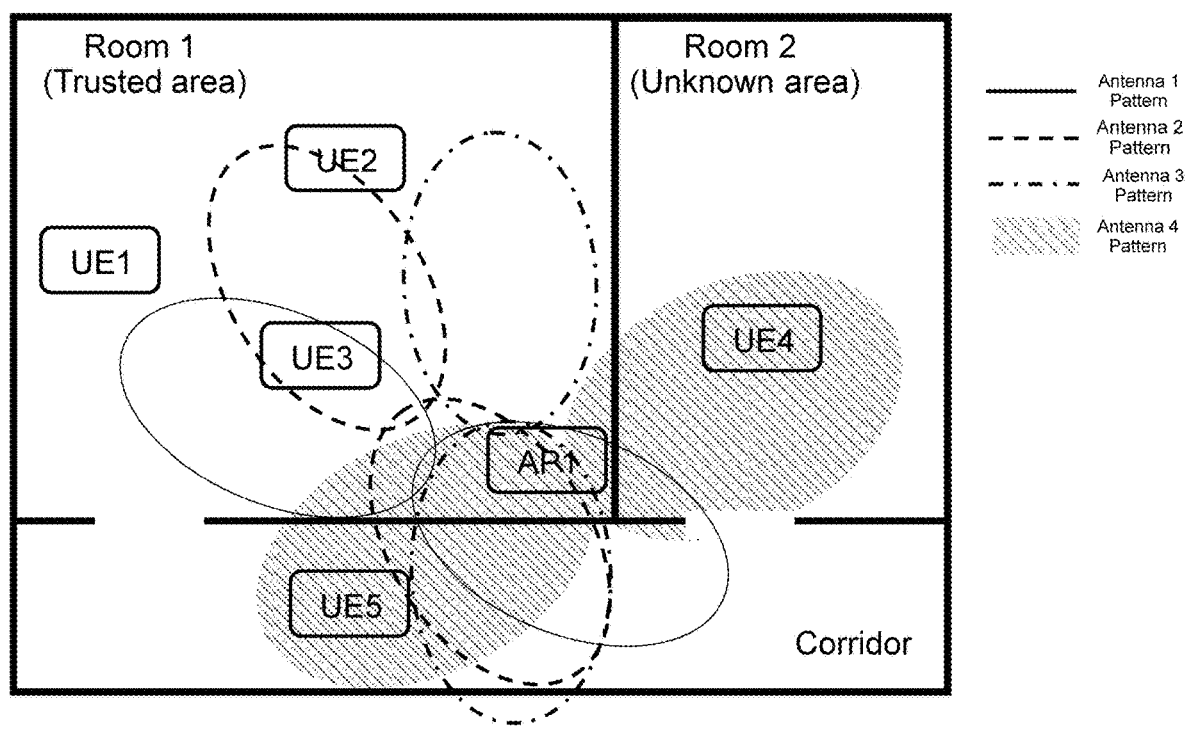
FIG. 2 shows an example network footprint for an office.

FIG. 2 shows an example network footprint for an office. The office includes two offices or rooms (Room 1 and Room 2), and a corridor for accessing the offices. An access point AP1 is centrally located to service the needs of the network footprint. Five user equipment devices, or clients, are distributed around the office, wherein devices UE1; UE2; and UE3 are located in Room 1 which is a "trusted area", whereas device UE4 is located in Room 2, and device UE5 is located in the corridor, each of Room 2 and the corridor being an "unknown area" or "untrusted area". The access point AP1 includes four antennas in a MIMO configuration, one or more of the four antennas comprises an active multi-mode antenna as described herein. Three of the antennas are used to produce corresponding first through third radiation patterns, each of the first through third radiation patterns are generated by the access point to maximize link budget with the devices in the trusted area. The fourth antenna of the access point is configured to produce a fourth radiation pattern, which is directed to the adjacent Room 2 and the corridor, or the unknown/untrusted areas. Note the fourth radiation pattern is configured to produce noise such that devices UE4 and UE5 cannot connect to the network, effectively securing the network in a physical sense.

The access point can be configured or setup to provide signal link in the trusted areas and further provide interference or noise in the untrusted areas; this setup would be primarily focused on the area footprint for security (i.e. certain rooms are trusted or untrusted). Alternatively, the access point can be configured to sample the network and steer either signal link or noise in the direction of individual devices (based on an access query or login permissions) by varying a mode of the active multi-mode antenna(s) such that maxima and/or nulls are directed accordingly.

FIG. 3 shows an example of a link quality matrix, wherein each antenna is surveyed for each antenna mode and each device on the network and the corresponding signal link quality is determined and populated in the matrix. The matrix may be implemented in the form of a lookup table in memory. The signal quality metric can include, signal to interference plus noise ratio (SINR), received signal strength indicator (RSSI), reference signal received power (RSRP), or a similar metric recognized by those with skill in the art, or a combination thereof. At pre-determined time intervals, the antenna system can be configured to re-survey and update the link quality matrix data. Thus, an antenna system including one or more active multi-mode antennas coupled to a controller and memory, wherein the memory contains a link quality matrix, is capable of determining which antenna and mode combination is best suited for optimum communication link with one or more devices on a network. At the same time, if desired, another multi-mode antenna which is not used to communicate with trusted devices can produce noise steered in a direction away from the trusted devices. The controller and memory may be housed in the access point, or elsewhere on the network, or within a device on the network.

Figure 4:
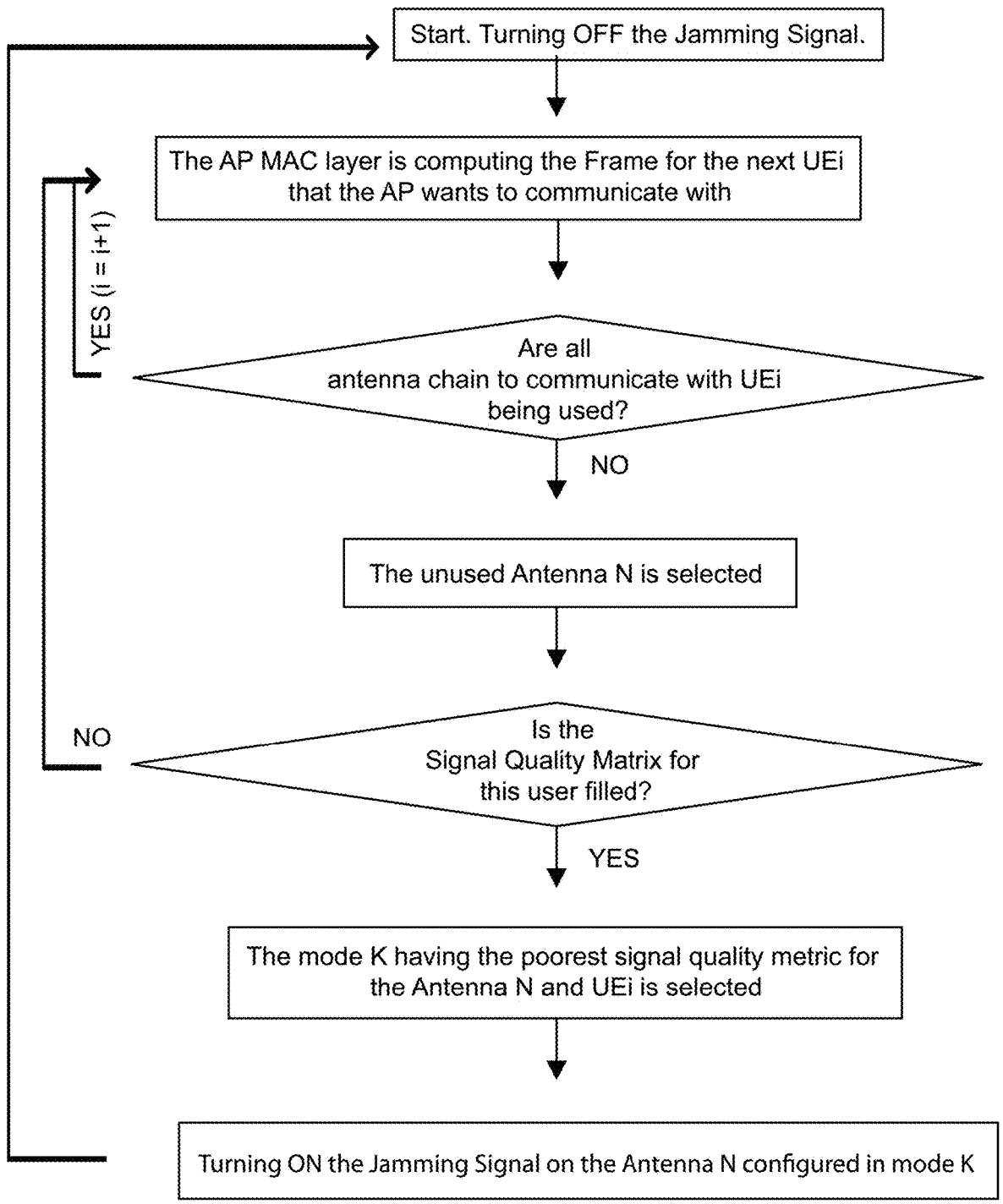
FIG. 4 shows an algorithm process for physical network security using a multi-mode antenna system.

FIG. 4 shows an algorithm process for physical network security using an active multi-mode antenna, the algorithm includes:

Step 1: start/initialize; turning "off" any and all interfering or noise signals;

Step 2: the access point MAC layer is computing the frame for the next UEi that the access point wants to communicate with;

Step 3: are all antenna chain to communicate with the UEi, being used? (if "Yes" then repeat Step 2; if "No" then proceed to Step 4);

Step 4: select unused antenna N for noise generation;

Step 5: is the Signal Quality Matrix for this user filled? (If "Yes" then proceed to Step 6; if "No" then repeat Step 2.);

Step 6 select the mode "K" of antenna N, wherein "K" has the weakest signal quality for the selected antenna N and users UEi;

Step 7: turn on interfering signal using selected antenna N configured in mode K.

While this document contains specific illustrated examples, the details and descriptions of the illustrated embodiments should not be construed as limitations on the scope of the claimed invention, but rather as descriptions of features specific to particular embodiments of the invention which are provided for enabling those having skill in the art to make and use, in general, one or more embodiments of the claimed invention. Other embodiments will be appreciated by those having skill in the art upon a thorough review of the instant disclosure.

Figure 5:
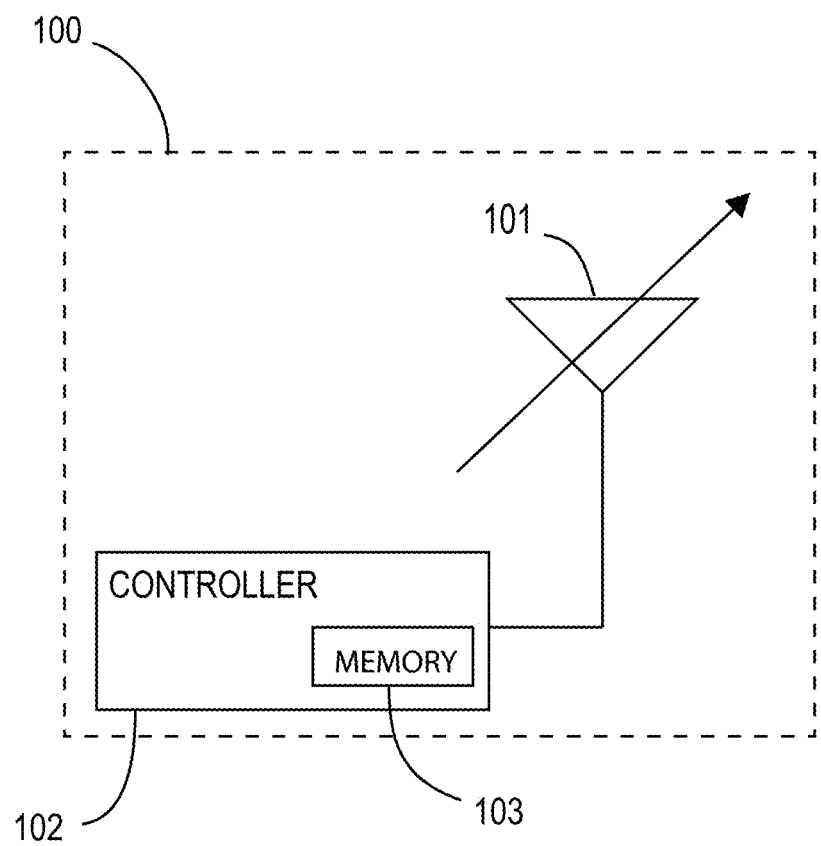
FIG. 5 shows an antenna system in accordance with an embodiment.

FIG. 5 shows fin antenna system in accordance with an embodiment. In this example, in a network having a network footprint including one or more trusted areas and one or more untrusted areas, the network further including one or more user equipment devices (UE) positioned in the trusted and untrusted areas, an access point for communicating with the user equipment devices within the network footprint is disclosed, the access point including: an antenna system 100, the antenna system comprising: an active multi-mode antenna 101, the active multi-mode antenna being configurable in one of a plurality of possible antenna modes, wherein the active multi-mode antenna exhibits a distinct radiation pattern when configured in each of said plurality of possible antenna modes; the active multi-mode antenna coupled to a controller 102 and memory 103, said memory including signal quality data associated with a link quality metric relating link quality between each of the one or more user equipment devices and the active multi-mode antenna in each of the plurality of possible modes thereof, the controller being configured to communicate signals tor adjusting the mode of the active multi-mode antenna based on the signal quality data, the active multi-mode antenna being adapted to produce an interfering signal, and further adapted to steer the interfering signal in a direction toward at least one of the untrusted areas of the network footprint by changing a mode of the active multi-mode antenna; wherein said interfering signal physically limits link budget between the access point and a device positioned in the at least one of the untrusted areas of the network footprint.

The memory may constitute any non-transitory computer readable medium capable of containing the signal quality data. The memory may be housed within a volume of the controller, or may be housed separately and outside of the controller volume.

The link quality metric may comprise, signal to interference plus noise ratio (SINR), received signal strength indicator (RSSI), and/or reference signal received power (RSRP).

The antenna system may comprise a plurality of active multi-mode antennas.

In one embodiment, the antenna system comprises four active multi-mode antennas, wherein a first through third of said four active multi-mode antennas are each configured in corresponding modes thereof wherein optimal link quality is achieved with the user equipment devices positioned in the one or more trusted areas of the network footprint; and wherein a fourth of said four active multi-mode antennas produces the interfering signal and is configured in a mode wherein weakest signal quality is achieved with the user equipment devices positioned in the one or more trusted areas of the network footprint.

The fourth active modal antenna may be configured to direct the interfering signal toward one or more of the untrusted areas of the network footprint.

The controller and memory may be housed in the access point, or at least one may be housed outside the access point.

In another embodiment, the controller is configured to execute an algorithm for selecting one of the active multi-mode antennas and configuring the selected antenna in one of the plurality of possible modes thereof, the algorithm comprising: (i) Step 1: turning "off" interfering signals; (ii) Step 2: with the access point MAC layer, computing the frame for the next UEi that the access point wants to communicate with; (iii) Step 3: if all antenna chain to communicate with the UEi, are being used then repeat Step 2, otherwise proceed to Step 4; (iv) Step 4: select unused antenna N for noise generation, (v) Step 5: if the Signal Quality Matrix for this user filled then proceed to Step 6, otherwise repeat Step 2; (vi) Step 6: select the mode "K", wherein "K" has the weakest signal quality for the selected antenna N and users UEis; and (vii) Step 7: turn on interfering signal using selected antenna N configured in mode K.

In some embodiments, several antennas can be used to generate interfering signal(s) on different channels or in different areas.

One having skill in the art will recognize that certain variations, combinations and derivatives can be achieved without undue experimentation by combining the explicit features of this disclosure with the ordinary level of knowledge and skill in the art; and such variations, combinations and derivatives are therefore deemed to be captured within the scope of this disclosure and the appended claims.

What is claimed is:

1. A method for controlling active multi-mode antennas of a first device on a network, the method comprising:

accessing, by one or more controllers, signal quality data stored in a memory device, the signal quality data comprising at least one link quality metric relating link quality between one or more second devices on the network and the active multi-mode antennas of the first device for each of a plurality of modes for in which the active multi-mode antennas are configurable, each of the plurality of modes associated with a different radiation pattern;

configuring, by the one or more controllers, a first active multi-mode antenna of the active multi-mode antennas in a first mode of the plurality of modes to communicate with at least one second device physically located in a first area of a network footprint based on the signal quality data;

configuring, by the one or more controllers, a second active multi-mode antenna of the first device in a second mode of the plurality of modes to communicate with at least one third device positioned in a second area of the network footprint;

producing, by the one or more controllers, an interfering signal to reduce signal quality for a communication link with the at least one third device positioned in the second area of the network footprint; and communicating, via the second active multi-mode antenna, the interfering signal to the at least one third device while the second active multi-mode antenna is configured in the second mode.

2. The method of claim 1, wherein the first area of the network footprint is a trusted area.

3. The method of claim 2, wherein the second area of the network footprint is an untrusted area.

4. The method of claim 1, wherein said link quality metric comprises: signal to interference plus noise ratio (SINR), received signal strength indicator (RSSI), reference signal received power (RSRP).

5. The method of claim 1, wherein the first device is a network access point.

6. The method of claim 1, wherein the first device is a client device.

7. The method of claim 1, wherein each of the active multi-mode antennas of the first device comprise a radiating element and one or more parasitic elements, each of the one or more parasitic elements coupled to an active component configured to vary a reactive load for the parasitic element.

8. The method of claim 1, wherein the method comprises learning which portion of a network footprint is a trusted area and which portion of a network footprint is an untrusted area.

9. The method of claim 8, wherein learning which portion of a network footprint is a trusted area and which portion of a network footprint is an untrusted area comprises receiving a user input via an application installed on a device in communication with the first device.

10. The method of claim 1, wherein producing the interfering signal occurs in response to configuring the second active multi-mode antenna in the second mode of the plurality of modes to communicate with the at least one third device positioned within the second area of the network footprint.

11. A network device, comprising:
a plurality of active multi-mode antennas, each of the active multi-mode antennas configurable in a plurality of modes, each mode associated with a different radiation pattern;
a controller configured to
configure a first active multi-mode antenna of the plurality of active multi-mode antennas in a first mode of the plurality of modes to communicate with a first device physically located in a first area of a network footprint; and
configure a second active multi-mode antenna of the plurality of active multi-mode antennas in a second mode of the plurality of modes to communicate with a second device physically located in a second area of the network footprint; and
communicate an interfering signal to the second device via the second active multi-mode antenna while the second active multi-mode antenna is configured in the second mode of the plurality of modes to reduce signal quality for the second device.

12. The network device of claim 11, wherein the network device comprises a second active multi-mode antenna configurable in a plurality of modes, each mode associated with a different radiation pattern.

13. The network device of claim 12, wherein the controller is configured to control the second active multi-mode antenna to communicate with a device positioned in a trusted area of the network footprint.

14. The network device of claim 11, wherein the network device is a network access point.

* * * * *